US012677881B2

(12) United States Patent
Reevell

(10) Patent No.: US 12,677,881 B2
(45) Date of Patent: Jul. 14, 2026

(54) ELEMENT FOR AN AEROSOL-GENERATING SYSTEM COMPRISING DISABLING MECHANISM

(71) Applicant: Altria Client Services LLC, Richmond, VA (US)

(72) Inventor: Tony Reevell, London (GB)

(73) Assignee: Altria Client Services LLC, Richmond, VA (US)

( * ) Notice: Subject to any disclaimer, the term of this patent is extended or adjusted under 35 U.S.C. 154(b) by 250 days.

(21) Appl. No.: 18/397,307

(22) Filed: Dec. 27, 2023

(65) Prior Publication Data

US 2024/0122254 A1 Apr. 18, 2024

Related U.S. Application Data

(60) Continuation of application No. 16/918,087, filed on Jul. 1, 2020, now Pat. No. 11,864,591, which is a
(Continued)

(30) Foreign Application Priority Data

Jan. 8, 2016 (EP) .................................... 16150668

(51) Int. Cl.
*A24F 40/485* (2020.01)
*A24F 40/10* (2020.01)
(Continued)

(52) U.S. Cl.
CPC ............ *A24F 40/485* (2020.01); *A24F 40/42* (2020.01); *A24F 40/49* (2020.01); *B65D 25/08* (2013.01);
(Continued)

(58) Field of Classification Search
None
See application file for complete search history.

(56) References Cited

U.S. PATENT DOCUMENTS 2,860,638 A * 11/1958 Bartolomeo ............ A24F 42/60 131/273
3,270,750 A * 9/1966 Campbell ............. A24D 3/041 131/338
(Continued)

FOREIGN PATENT DOCUMENTS

CN 103338663 A 10/2013
CN 103945715 A 7/2014
(Continued)

OTHER PUBLICATIONS

Office Action dated Jan. 19, 2024 issued in related Korean patent application No. 10-2018-7018602.
(Continued)

*Primary Examiner* — Thor S Campbell
(74) *Attorney, Agent, or Firm* — Harness, Dickey & Pierce, P.L.C.

(57) ABSTRACT

An element for an aerosol-generating system, a cartridge for an aerosol-generating system, and an aerosol-generating system, wherein the element, the cartridge and the aerosol-generating system each include a storage portion for storing an aerosol-forming substrate and a manually operated disabling mechanism for rendering the element, the cartridge, or the aerosol-generating system irreversibly inoperable. The element, the cartridge, and the aerosol-generating system may include an aerosol generator and one or more air passages. The disabling mechanism may be configured to render at least one of the storage portion, the aerosol generator, and the one or more air passages irreversibly inoperable.

16 Claims, 4 Drawing Sheets

Related U.S. Application Data division of application No. 15/399,883, filed on Jan. 6, 2017, now Pat. No. 10,729,178, which is a continuation of application No. PCT/EP2016/081445, filed on Dec. 16, 2016.

(51) Int. Cl.

| | |
|---|---|
| ***A24F 40/42*** | (2020.01) |
| ***A24F 40/49*** | (2020.01) |
| ***B65D 25/08*** | (2006.01) |
| ***B65D 49/02*** | (2006.01) |
| ***H05B 3/00*** | (2006.01) |

(52) U.S. Cl.

CPC ........... *B65D 49/02* (2013.01); *H05B 3/0019* (2013.01); *A24F 40/10* (2020.01); *H05B 2203/021* (2013.01)

(56) References Cited

U.S. PATENT DOCUMENTS

| | | | | |
|---|---|---|---|---|
| 4,171,000 | A * | 10/1979 | Uhle | A61M 15/06 131/273 |
| 5,535,735 | A * | 7/1996 | McPherson | A61M 16/20 131/273 |
| 5,709,668 | A | 1/1998 | Wacks | |
| 8,109,267 | B2 | 2/2012 | Villax et al. | |
| 9,730,473 | B2 * | 8/2017 | Shinkawa | A24D 3/17 |
| 2007/0107720 | A1 | 5/2007 | Boeck et al. | |
| 2009/0183744 | A1 | 7/2009 | Hayton et al. | |
| 2011/0265806 | A1 | 11/2011 | Alarcon et al. | |
| 2013/0306084 | A1 * | 11/2013 | Flick | B63C 9/115 131/328 |
| 2014/0253144 | A1 | 9/2014 | Novak, III et al. | |
| 2014/0261407 | A1 | 9/2014 | Roberts et al. | |
| 2014/0261408 | A1 * | 9/2014 | DePiano | A24F 40/46 128/202.21 |
| 2014/0311505 | A1 | 10/2014 | Liu | |
| 2015/0040929 | A1 * | 2/2015 | Hon | A24F 40/42 392/394 |
| 2015/0053214 | A1 * | 2/2015 | Alarcon | A24F 40/95 131/273 |
| 2015/0136132 | A1 * | 5/2015 | Papania | A61M 16/0045 128/203.15 |
| 2015/0136155 | A1 | 5/2015 | Verleur et al. | |
| 2015/0173417 | A1 | 6/2015 | Gennrich et al. | |
| 2015/0173422 | A1 | 6/2015 | Liu | |
| 2015/0181928 | A1 | 7/2015 | Liu | |
| 2015/0189920 | A1 | 7/2015 | Liu | |
| 2015/0208729 | A1 * | 7/2015 | Monsees | A24F 40/40 131/329 |
| 2015/0237917 | A1 * | 8/2015 | Lord | A24F 40/53 131/328 |
| 2015/0342257 | A1 * | 12/2015 | Chen | H05B 3/06 392/390 |
| 2016/0000147 | A1 * | 1/2016 | Li | A24F 40/485 392/404 |
| 2016/0192708 | A1 * | 7/2016 | DeMeritt | H05B 3/40 392/390 |
| 2017/0231278 | A1 * | 8/2017 | Mironov | G01F 23/26 392/390 |
| 2017/0318861 | A1 * | 11/2017 | Thorens | A24F 40/53 |
| 2018/0168228 | A1 * | 6/2018 | Reevell | A24F 40/48 |
| 2018/0177238 | A1 * | 6/2018 | Bessant | G01C 9/18 |
| 2018/0242644 | A1 * | 8/2018 | Bessant | H05B 3/34 |
| 2019/0104767 | A1 * | 4/2019 | Hatton | G01L 9/0072 |

FOREIGN PATENT DOCUMENTS

| | | | |
|---|---|---|---|
| CN | 204722261 | U | 10/2015 |
| CN | 105197430 | A | 12/2015 |
| EP | 2468118 | A1 | 6/2012 |
| EP | 2891415 | A2 | 7/2015 |
| JP | 2009-537199 | A | 10/2009 |
| JP | 2014-501106 | A | 1/2014 |
| KR | 10-2014-0085382 | A | 7/2014 |
| WO | WO-9609850 | A2 | 4/1996 |
| WO | WO-2013/093695 | A1 | 6/2013 |
| WO | WO-2014/150979 | A2 | 9/2014 |
| WO | WO-2014/195859 | A2 | 12/2014 |
| WO | WO-2015/097005 | A1 | 7/2015 |
| WO | WO-2015/100361 | A1 | 7/2015 |

OTHER PUBLICATIONS

Extended European Search Report for European Patent Application No. 16150668.8 Dated Jun. 17, 2016.

International Search Report and Written Opinion international application No. PCT/EP2016/081445 dated Feb. 23, 2017.

International Preliminary Report on Patentability issued Jul. 10, 2018 in International Application No. PCT/EP2016/081445.

European Office Action for corresponding Application No. 16815833.5-1004, dated Jul. 26, 2019.

Russian Office Action for corresponding Application No. 2018124782, dated Jan. 28, 2020, English translation thereof.

European Summons to Attend Oral Proceedings corresponding to Application No. 16815833.5. dated Jun. 9, 2020.

Chinese Office Action dated Oct. 19, 2020 for corresponding Chinese Application No. 201680073706.8, and English-language translation thereof.

Japanese Office Action dated Nov. 30, 2020 for corresponding Japanese Application No. P 2018-535345, and English-language translation thereof.

European Brief Communication dated Jan. 25, 2021 for corresponding European Application No. 16815833.5.

Office Action for corresponding Russian Application No. 2018124782 dated Apr. 23, 2021.

Chinese Office Action dated Jul. 6, 2021 for corresponding Chinese Application No. 201680073706.8, and English-language translation thereof.

Japanese Notice of Allowance dated Sep. 27, 2021 for corresponding Japanese Application No. 2018-535345, and English-language translation thereof.

Russian Notice of Allowance dated Dec. 13, 2021 for corresponding Russian Application No. 2018124782, and English-language translation thereof.

Office Action dated Mar. 1, 2022 issued in corresponding Chinese patent application No. 201680073706.8.

Notice of Allowance dated Jun. 19, 2025 issued in Korean patent application No. 10-2018-7018602.

Office Action dated Sep. 27, 2024 issued in Korean patent application No. 10-2018-7018602.

* cited by examiner

ELEMENT FOR AN AEROSOL-GENERATING SYSTEM COMPRISING DISABLING MECHANISM

This is a continuation of U.S. application Ser. No. 16/918,087, filed Jul. 1, 2020, which is a division of U.S. application Ser. No. 15/399,883, filed Jan. 6, 2017, which is a continuation of and claims priority to PCT/EP2016/081445 filed on Dec. 16, 2016, and further claims priority to EP 16150668.8 filed on Jan. 8, 2016; the entire contents of each of which are incorporated herein by reference.

BACKGROUND

At least one example embodiment relates to an element for an aerosol-generating system. At least one example embodiment relates to a part for an electrically operated smoking system.

One type of aerosol-generating system is an electrically operated smoking system. Electrically operated smoking systems typically use a liquid aerosol-forming substrate which is atomized to form an aerosol. Electrically operated smoking systems often comprise a power supply, a liquid-storage portion for holding a supply of liquid aerosol-forming substrate and an atomizer.

It is known to provide electrically operated smoking systems with a disabling mechanism, such as fusible links, that are operated by control electronics to render a system or a cartridge inoperable in response to particular operating conditions. However, such disabling mechanism does not provide an adult vaper with a choice of when to render a system inoperable. It is also known to provide electrically operated smoking systems with a temporary disabling mechanism, such as caps and rotatable valves, to temporarily obstruct passages of the system, when the system is not in use. However, such a temporary disabling mechanism may be removed to restore operation of the smoking system, and therefore, do not enable an adult vaper to render a system or a cartridge irreversibly inoperable.

It would be desirable to provide an aerosol-generating system or an element for an aerosol-generating system, such as a cartridge, that enables an adult vaper to render an aerosol-generating system or an element for an aerosol-generating system irreversibly inoperable, at a time of the adult vaper's choosing, to substantially prevent or inhibit unauthorized use of the aerosol-generating system.

SUMMARY

At least one example embodiment relates to an element for an aerosol-generating system, the element comprising: a storage portion for holding an aerosol-forming substrate; and a manually operated disabling mechanism for rendering the element irreversibly inoperable.

In at least one example embodiment, an aerosol-generating device may be able to manually operate the disabling mechanism to render the element irreversibly inoperable for several reasons. The manually operated disabling mechanism enables an adult vaper to prevent unauthorized operation of the element. The manually operated disabling mechanism enables an adult vaper to decide when the element is to be rendered irreversibly inoperable. An adult vaper may decide to render the element irreversibly inoperable to substantially prevent or inhibit filling or refilling of the storage portion with inappropriate or even harmful substrate materials. An adult vaper may decide to render the element irreversibly inoperable to substantially prevent or inhibit unauthorized access to aerosol-forming substrate held in the storage portion. An adult vaper may decide to render the element irreversibly inoperable to substantially prevent or inhibit operation of an aerosol-generating system. An adult vaper may decide to render the element irreversibly inoperable to substantially prevent or inhibit operation of the element in an aerosol-generating system. By rendering the element irreversibly inoperably, an adult vaper may be more inclined to dispose of a used or unwanted element or aerosol-generating system.

BRIEF DESCRIPTION OF THE DRAWINGS

The invention will be further described, by way of example only, with reference to the accompanying drawings, in which.

DETAILED DESCRIPTION

Figure 1:
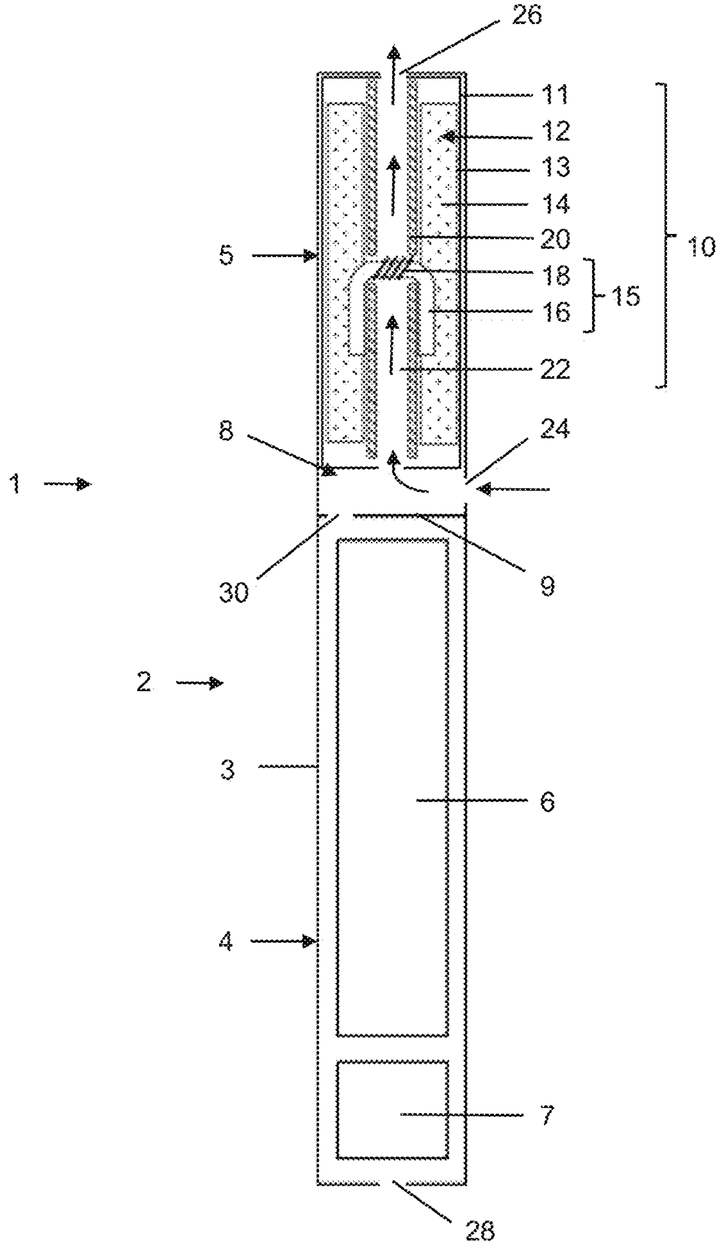
FIG. 1 is a schematic view of an electrically operated smoking system of the prior art.

Various example embodiments will now be described more fully with reference to the accompanying drawings in which some example embodiments are shown. However, specific structural and functional details disclosed herein are merely representative for purposes of describing example embodiments. Thus, the embodiments may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope.

In the drawings, the thicknesses of layers and regions may be exaggerated for clarity, and like numbers refer to like elements throughout the description of the figures.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to more specifically describe example embodiments, various features will be described in detail with reference to the attached drawings. However, example embodiments described are not limited thereto.

As used herein with reference to at least one example embodiment, the term 'manually operated' is used to describe disabling mechanisms that are operated by an adult vaper. In other words, the disabling mechanisms are configured to be operated by an adult vaper, rather than by a control system of an aerosol-generating system.

An element that has been rendered irreversibly inoperable by the manually operated disabling mechanism is an element that will not operate in or as part of an aerosol-generating system. An element that has been rendered irreversibly inoperable by the disabling mechanism may not be modified to operate in an aerosol-generating system, without substantially altering or potentially damaging the element. In other words, the disabling mechanism may be configured to render the element permanently inoperable.

The element may be part of a cartridge for an aerosol-generating system. The element may be a cartridge for an aerosol-generating system. The element may be an integral part of an aerosol-generating system. The element may be integrally formed in an aerosol-generating system. The element may be fixed to other elements or parts of an aerosol-generating system. The aerosol-generating system may be an electrically operated smoking system. The disabling mechanism may be configured to render the element, the cartridge, the aerosol-generating system or the electrically operated smoking system irreversibly inoperable.

The element may comprise additional features. The element may comprise an aerosol generator. The element may comprise one or more air passages. Where the element comprises the aerosol generator, at least a portion of the aerosol generator may be arranged in one or more of the one or more air passages. The disabling mechanism may be configured to render any feature of the element irreversibly inoperable. The disabling mechanism may be configured to render one or more features of the element irreversibly inoperable. The disabling mechanism may be configured to render the storage portion irreversibly inoperable. The disabling mechanism may be configured to render the aerosol generator irreversibly inoperable. The disabling mechanism may be configured to render the one or more air passages irreversibly inoperable.

The element may be configured to perform one or more functions. The element may be configured to hold aerosol-forming substrate. The element may be configured to supply aerosol-generating substrate to an aerosol-generating device. The element may be configured to atomize aerosol-forming substrate held in the storage portion. The element may be configured to supply atomized aerosol-forming substrate to an aerosol-generating device. The disabling mechanism may be configured to substantially prevent the element from performing one or more of the one or more functions.

The manually operated disabling mechanism may comprise a mechanical disabling mechanism. The manually operated disabling mechanism may comprise a disabling mechanism. The disabling mechanism may comprise movable parts. The movable parts may be movable by physical force. In at least one example embodiment, the disabling mechanism may be operated by an adult vaper applying rotation, deformation, stress or pressure to the disabling mechanism. Mechanical disabling mechanisms may enable an adult vaper to manually render the element irreversibly inoperable, without connection of the element to an electrical power supply.

The disabling mechanism may be configured to be manually operated by any suitable action of an adult vaper. The disabling mechanism may be configured to be pressed by an adult vaper. The disabling mechanism may be configured to be stubbed by an adult vaper, in a manner similar to stubbing out a cigar or cigarette. The disabling mechanism may be configured to be compressed by an adult vaper. The disabling mechanism may be configured to be twisted by an adult vaper. The disabling mechanism may be configured to be bent by an adult vaper. The disabling mechanism may be configured to be pulled by an adult vaper. By performing a disabling action to operate the disabling mechanism and render the element permanently irreversibly inoperable, an adult vaper may be further inclined to dispose of the element or the aerosol-generating system.

The disabling mechanism may be configured to break or damage a feature or a part of the element on operation of the disabling mechanism. The feature or part of the element may be a connection between the element and another element of the aerosol-generating system.

The disabling mechanism may comprise any suitable means for manually operating the disabling mechanism. In at least one example embodiment, the disabling mechanism may comprise a push button. The disabling mechanism may comprise a switch. The disabling mechanism may comprise a lever.

The element may comprise a housing. Where the element is part of a cartridge, the housing may be at least a portion of a housing of the cartridge. Where the element is part of an aerosol-generating system, the housing may be at least part of a housing of the aerosol-generating system.

Where the element comprises a housing, the disabling mechanism may comprise at least a portion of the housing. The means for manually operating the disabling mechanism may comprise the portion of the housing. By configuring a portion of the housing as the means for manually operating the disabling mechanism, operation of the disabling mechanism may alter the outward appearance of the element. This may encourage an adult vaper to dispose of an element that has been rendered irreversibly inoperable.

The element may comprise a housing. The housing comprises a first housing part and a second housing part. The first housing part may be manually movable relative to the second housing part to operate the disabling mechanism. The first housing part may be receivable in the second housing part. The first housing part may be receivable in the second housing part with an interference fit. The interference fit may make operating the disabling mechanism more difficult for an adult vaper. This may reduce the likelihood of accidental operation of the disabling mechanism by an adult vaper.

The first housing part may be configured to be pushed by an adult vaper towards the second housing part to operate the disabling mechanism. The first housing part may be configured to be pushed by an adult vaper into the second housing part to operate the disabling mechanism. The first housing part may be arranged to be operated as a push button. The first housing part and the second housing part may be arranged at an end of the element. This may enable an adult vaper to operate the disabling mechanism by stubbing the element at the first housing part end, pushing the first housing part into the second housing part to operate the disabling mechanism. This may change the outward appearance of the element and indicate to a prospective adult vaper that the element has been rendered irreversibly inoperable. This may also encourage an adult vaper to dispose of an inoperable element.

In at least one example embodiment, the first housing part may be configured to be pulled by an adult vaper away from the second housing part to operate the disabling mechanism. The first housing part may be configured to be pulled by an adult vaper out of the second housing part to operate the disabling mechanism. The second housing part may be configured to be compressed by an adult vaper towards the first housing part to operate the disabling mechanism.

The first housing part may be movable relative to the second housing part from an operating arrangement to a disabling arrangement to operate the disabling mechanism. The element may be operable when the first housing part is in the operating arrangement. The element may be inoperable when the first housing part is in the disabling arrangement. The disabling mechanism may be configured to substantially prevent or inhibit an adult vaper from moving the first housing part from the disabling arrangement to the operating arrangement. This may substantially prevent unauthorized operation of the element after operation of the disabling mechanism.

The first housing part and the second housing part may be arranged such that the first housing part is substantially contained in the second housing part when the first housing part is in the disabling arrangement. When the first housing part is in the disabling arrangement, the first housing part and the second housing part may be arranged such that the first housing part is substantially inaccessible to an adult vaper. This may substantially prevent or inhibit an adult vaper from moving the first housing part from the disabling arrangement to the operating arrangement.

The disabling mechanism may comprise locking means to substantially prevent or inhibit movement of the first housing part from the disabling arrangement to the operating arrangement. The locking means may be configured to substantially prevent or inhibit movement of the first housing part relative to the second housing part when the first housing part is in the disabling arrangement. The locking means may comprise any suitable means of securing the first housing part to the second housing part. The locking means may comprise a latch. The locking means may comprise bonding material, such as an adhesive. The locking means may be arranged on the first housing part. The locking means may be arranged on the second housing part. The locking means may be arranged on the first housing part and the second housing part.

The element may comprise a housing comprising a manually deformable portion. The manually deformable portion may be arranged to operate the disabling mechanism on deformation of the manually deformable portion. Deforming the housing of the element may alter the outward appearance of the element. This may indicate to a prospective user that the element has been rendered irreversibly inoperable. This may also encourage an adult vaper to dispose of an inoperable element. The manually deformable portion may be configured to deform on any suitable action of an adult vaper. The manually deformable portion may be configured to deform on the application of compression, tension or torsion by an adult vaper. The manually deformable portion may comprise a portion having any suitable structural weakness. The manually deformable portion may comprise a portion of the housing having a reduced thickness. The manually deformable portion may comprise a scored portion. The manually deformable portion may comprise a joint between two housing portions.

The disabling mechanism may be configured to render the storage portion irreversibly inoperable. This may substantially prevent or inhibit unauthorized access to aerosol-forming substrate held in the storage portion.

The storage portion may comprise means of conveying aerosol-forming substrate held in the storage portion out of the storage portion. The storage portion may comprise one or more passages for conveying aerosol-forming substrate from the storage portion. The disabling mechanism may be configured to substantially prevent or inhibit aerosol-forming substrate from leaving the storage portion. The disabling mechanism may be configured to block aerosol-forming substrate from leaving the storage portion. The disabling mechanism may comprise one or more barriers to block aerosol-forming substrate from leaving the storage portion. The one or more barriers may be arranged to block the one or more passages for conveying aerosol-forming substrate from the storage portion on operation of the disabling mechanism.

The storage portion may comprise a housing. The housing of the storage portion may be a rigid housing. As used herein, the term 'rigid housing' is used to mean a housing that is self-supporting. The storage portion may be configured to hold any suitable aerosol-forming substrate. The storage portion may be configured to hold a solid aerosol-forming substrate. The storage portion may be configured to hold a liquid aerosol-forming substrate. The storage portion may be configured to hold a liquid and a solid aerosols-forming substrate.

Where the aerosol-forming substrate comprises a liquid aerosol-forming substrate, the storage portion may be a liquid storage portion configured to hold the liquid aerosol-forming substrate. The disabling mechanism may be configured to render the liquid storage portion irreversibly inoperable. This may substantially prevent or inhibit an adult vaper from refilling the storage portion with unauthorised and potentially harmful substrate materials.

The disabling mechanism may be configured to render the liquid storage portion irreversibly inoperable by piercing the liquid storage portion on operation of the disabling mechanism. Piercing the liquid storage portion may render the liquid storage portion unsuitable for holding a liquid aerosol-forming substrate. Where the liquid storage portion comprises a housing, the disabling mechanism may be configured to pierce or break the housing of the liquid storage portion. The housing of the liquid storage portion may comprise one or more frangible portions. The one or more frangible portions may be substantially structurally weakened portions compared to the other portions of the housing. The one or more frangible portions may be thinner than the other portions of the housing. The frangible portions may be configured and arranged to be pierced or broken on operation of the disabling mechanism.

The disabling mechanism may comprise one or more piercing elements. In at least one example embodiment, the disabling mechanism may comprise, one, two, three four, five or six piercing elements. Where the housing comprises one or more frangible portions, the one or more piercing elements may be arranged opposite the one or more frangible portions. The one or more piercing elements may be arranged to be brought into contact with the frangible portions on operation of the disabling mechanism to pierce or break the one or more frangible portions. The one or more piercing elements may comprise one or more passages to enable fluid communication through the one or more piercing elements. The one or more piercing elements may comprise any suitable material. Examples of suitable materials include metals, alloys, plastics or composite materials. Where the element comprises a housing, the one or more piercing elements may comprise the same material as the housing.

The one or more piercing elements may comprise one or more spikes. The one or more spikes may comprise one or more piercing tips. The one or more spikes may have any suitable shape. The one or more spikes may be substantially conical or pyramidal. The one or more piercing elements may comprise one or more blades. The one or more blades may comprise one or more cutting edges. The one or more cutting edges may be sharp. The one or more blades may have any suitable shape. The one or more blades may be substantially planar or non-planar. The one or more blades may be arcuate. The one or more blades may be substantially circular or elliptical.

Where the element comprises the housing, the one or more piercing elements may be arranged in and/or on the housing of the element. Where the housing of the element comprises a first housing part and a second housing part, the one or more piercing elements may be arranged on the first housing part, the second housing part or both the first housing part and the second housing part. The one or more piercing elements may be configured to move with the first housing part on operation of the disabling mechanism to pierce the liquid storage portion. Where the housing comprises a manually deformable portion, the one or more piercing elements may be positioned on the housing towards or at the manually deformable portion. The one or more piercing elements may be arranged to move with the manually deformable portion on deformation of the manually deformable portion to pierce the liquid storage portion.

The disabling mechanism may comprise a secondary storage portion. The secondary storage portion may be substantially isolated from the liquid storage portion. In other words, the secondary storage portion may not be in fluid communication with the liquid storage portion. The housing of the liquid portion may substantially isolate the liquid storage portion from the secondary storage portion. The secondary storage portion may comprise a housing. The housing of the secondary storage portion may substantially isolate the secondary storage portion from the liquid storage portion.

The disabling mechanism may be configured to enable fluid communication between the liquid storage portion and the secondary storage portion on operation of the disabling mechanism. The disabling mechanism may be configured to enable fluid communication between the liquid storage portion and the secondary storage portion. The disabling mechanism may comprise a means for enabling fluid communication between the liquid storage portion and the secondary storage portion on operation of the disabling mechanism. The secondary storage portion may be configured to collect liquid aerosol-forming substrate from the liquid storage portion on operation of the disabling mechanism. The secondary storage portion may be configured to retain collected liquid aerosol-forming substrate.

Where the disabling mechanism comprises one or more piercing elements, the one or more piercing elements may be arranged to pierce at least one of the housing of the liquid storage portion and the housing of the secondary storage portion to enable fluid communication between the liquid storage portion and the secondary storage portion.

One or more passages may be provided between the liquid storage portion and the secondary storage portion to enable fluid communication between the liquid storage portion and the secondary storage portion. One or more one way-valves, or non-return valves, may be arranged in the one or more passages. The one or more one-way valves may enable communication of liquid aerosol-forming substrate from the liquid storage portion to the secondary storage portion. The one or more one-way valves may substantially prevent or inhibit communication of liquid aerosol-forming substrate from the secondary storage portion to the liquid storage portion. One or more barriers may be arranged in or around the one or more passages to substantially prevent or inhibit fluid communication through the one or more passages. The disabling mechanism may be configured to move, pierce or remove the one or more barriers on operation of the disabling mechanism. Where the disabling mechanism comprises one or more piercing elements, the one or more piercing elements may be arranged to pierce the one or more barriers on operation of the disabling mechanism.

The secondary storage portion may be configured at a lower pressure than the storage portion. On operation of the disabling mechanism, where fluid communication is permitted between the liquid storage portion and the secondary storage portion, the difference in pressure may urge liquid aerosol-forming substrate from the liquid storage portion to the secondary storage portion. The liquid storage portion may be configured at about atmospheric pressure (about 100 kPa or 1 atm). The secondary storage portion may be configured at between about 50% and about 95% of atmospheric pressure, between about 70% and 90% of atmospheric pressure, or at about 80% of atmospheric pressure.

The disabling mechanism may comprise sorbent material. The sorbent material may be arranged to absorb and/or adsorb liquid aerosol-forming substrate held in the liquid storage portion on operation of the disabling mechanism. On operation of the disabling mechanism, the sorbent material may be brought into contact with the liquid aerosol-forming substrate. On coming into contact with the sorbent material, the liquid aerosol-forming substrate may be absorbed and/or adsorbed by the sorbent material. The liquid aerosol-forming substrate may be retained with the sorbent material, such that the aerosol-forming substrate is substantially prevented or inhibited from being used to generate an aerosol in the aerosol-generating system.

Where the disabling mechanism comprises a secondary storage portion, the sorbent material may be arranged in the secondary storage portion. The secondary storage portion may be configured to retain the sorbent material on operation of the disabling mechanism. The secondary storage portion may be configured to release the sorbent material into the liquid storage portion on operation of the disabling mechanism.

The sorbent material may have any suitable structure. The sorbent material may have a spongy structure. The sorbent material may have a fibrous structure. The sorbent material may comprise any suitable material. The sorbent material may comprise absorbent material. The sorbent material may comprise adsorbent material. The sorbent material may comprise activated carbon. The sorbent material may comprise silica. The sorbent material may comprise cellulosic material. The sorbent material may comprise a desiccant. The sorbent material may comprise a polymeric material. The sorbent material may comprise a superabsorbent polymer (SAP).

The disabling mechanism may comprise a secondary storage portion comprising a sorbent material, such as a sponge, and one or more piercing elements for piercing the housing of the liquid storage portion on operation of the disabling mechanism. On operation of the disabling mechanism by an adult vaper, the one or more piercing elements may pierce the housing of the liquid storage portion, enabling fluid communication between the liquid storage portion and the secondary storage portion. Liquid aerosol-forming substrate may come into contact with the sorbent material in the secondary storage portion and be absorbed and/or adsorbed by the secondary storage portion. The sorbent material may retain the liquid aerosol-forming substrate in the secondary storage portion. This may render the liquid storage portion unsuitable for holding liquid aerosol-forming substrate. This may render the liquid storage portion irreversibly inoperable.

The element may comprise an aerosol generator. The aerosol generator may be arranged to receive aerosol-forming substrate held in the storage portion. The aerosol generator may comprise an atomizer. The aerosol generator may be configured to atomize the aerosol-forming substrate using heat. The aerosol generator may comprise heating means, such as a heating element. The aerosol generator may be configured to atomize the aerosol-forming substrate using ultrasonic vibrations. The aerosol generator may comprise an ultrasonic transducer.

Where the element comprises an aerosol generator, such as a vaporizer, arranged to receive aerosol-generating substrate held in the storage portion, the disabling mechanism may be configured to render the aerosol generator irreversibly inoperable.

The disabling mechanism may be configured to substantially prevent or inhibit aerosol-forming substrate from being received at the aerosol generator. This may be achieved by moving the aerosol-forming substrate from the storage portion to a secondary storage portion, substantially as described above. This may be achieved by releasing a substance, such as a sorbent material, into the storage portion, substantially as described above. This may be achieved by introducing one or more barriers between the storage portion and the aerosol generator. The disabling mechanism may comprise one or more barriers. The one or more barriers may be configured to be moved between the storage portion and the aerosol generator on operation of the disabling mechanism to substantially prevent or inhibit aerosol-forming substrate from being received at the aerosol generator.

The aerosol generator may be an electrically operated aerosol generator. The electrically operated aerosol generator may comprise an electrical circuit. The electrical circuit may be arranged to electrically connect the aerosol generator to a power source of the aerosol-generating system. The electrical circuit may be arranged to connect the aerosol generator to a control system of the aerosol-generating system.

The disabling mechanism may be configured to irreversibly break the electrical circuit. This may substantially prevent the element from being used in an aerosol-generating system to generate an aerosol. The electrical circuit may comprise one or more frangible connections. The disabling mechanism may be configured to irreversibly break the one or more frangible connections. The electrical circuit may comprise any suitable electrical conduits. The conduits may comprise wires or strips of foil. The wires may comprise any suitable material, such as metals or alloys. The one or more frangible connections may comprise any suitable electrical connection. Examples of suitable frangible connections comprise solder joints, spot welds, magnetic connections, crimped connections, press-fit connections, wrappers, and bonding materials, such as adhesives. The one or more frangible connections may comprise pressure-fit or force-fit connections, arranged to urge opposing connectors into contact without bonding.

Where the element comprises a housing, the one or more frangible connections may be arranged at or on the housing. Where the housing comprises a first housing part and a second housing part, the one or more frangible connections may be arranged at an interface between the first housing part and the second housing part. The one or more frangible connections may be configured to break on movement of the first housing part relative to the second housing part.

The electrical circuit may comprise a first wire and a second wire connected at a frangible connection. The first wire may be secured to the first housing part and arranged to move with the first housing part. The second wire may be connected to the second housing part and arranged to move with the second housing part. The frangible connection may be configured to break on movement of the first housing part relative to the second housing part.

Where the housing comprises a manually deformable portion, the one or more frangible connections may be arranged at the deformable portion. The one or more frangible connections may be configured to break on deformation of the manually deformable portion. The disabling mechanism may comprise one or more piercing or cutting elements arranged to pierce or cut the one or more frangible connections of the electrical circuit to break the electrical circuit.

The element may comprise one or more air passages. The air passages may enable airflow through the element. The provision of one or more air passages for airflow through the element may allow for an aerosol-generating system comprising the element to be compact. It may also allow for an aerosol-generating system comprising the element to be made symmetrical and balanced. The one or more air passages may also minimize heat loss from the device and enable the housing of the element or the system to be easily maintained at a temperature than is comfortable to hold by an adult vaper.

Where the element comprises an aerosol generator, at least a portion of the aerosol generator may be arranged in one or more of the one or more air passages. The aerosol generator may be configured to generated atomized aerosol-forming substrate in one or more of the one or more air passages. The one or more air passages may be arranged such that in use, an adult vaper may draw on the aerosol-generating system and draw air through the one or more air passages. Air drawn through the one or more air passages may entrain atomized aerosol-forming substrate generated by the aerosol generator and the entrained aerosol-forming substrate may be drawn through the system to the adult vaper, for inhalation.

Where the element comprises one or more air passages, the disabling mechanism may comprise means for rendering the one or more air passages irreversibly inoperable. The means for rendering the one or more air passages irreversibly inoperable may comprise means for substantially preventing or inhibiting airflow through the one or more air passages. This may substantially prevent an adult vaper from drawing an aerosol generated by an aerosol-generating system from or through the element. This may render the element irreversibly inoperable with an aerosol-generating system.

The disabling mechanism may comprise one or more barriers for blocking airflow through the one or more air passages. The one or more barriers may be movable to substantially obstruct the one or more air passages on operation of the disabling mechanism. The one or more barriers may substantially prevent or inhibit airflow through the one or more air passages. Where the element comprises a housing, the one or more barriers may be provided on the housing. Where the housing comprises a first housing part and a second housing part, the one or more barriers may be secured to at least one of the first housing part and the second housing part. The one or more barriers may be arranged to enable airflow through the one or more air passages, when the first housing part is in the operating arrangement. The one or more barriers may be arranged to substantially obstruct the one or more air passages on operation of the disabling mechanism. The one or more barriers may be arranged to substantially obstruct the one or more air passages when the first housing part is in the disabling arrangement. The one or more barriers may be arranged on a manually deformable portion of a housing. The one or more barriers may be movable to substantially obstruct the one or more air passages on deformation of the manually deformable portion to operate the disabling mechanism. The disabling mechanism may comprise one or more barriers arranged to substantially obstruct at least an air inlet or an air outlet of the one or more air passages. The disabling mechanism may comprise two or more barriers to substantially obstruct at least air inlet and an air outlet of the one or more air passages.

The manually operated disabling mechanism may comprise one or more of the disabling mechanism substantially as described herein. The disabling mean may comprise one or more of the means to render the storage portion irreversibly inoperable, the means to render the aerosol generator irreversibly inoperable and the means to render the one or more air passages irreversibly inoperable.

The element may have any suitable shape. The element may have a generally cylindrical shape having a length and a width. The element may have any desired cross-section, such as circular, hexagonal, octagonal or decagonal.

The means to manually operate the disabling mechanism may be arranged at any suitable location of the element. The means to manually operate the disabling mechanism may be arranged towards an end of the element, at an end of the element or at a central location along the length of the element.

As used herein with reference to the present invention, the term 'longitudinal' refers to the direction between opposing ends of the element. For an element in use with an aerosol-generating system, the longitudinal direction is the direction between the end of the element arranged towards the mouthpiece end of the aerosol-generating system and the opposing end of the element arranged towards the body end of the aerosol-generating system. The term 'transverse' is used to mean a direction perpendicular to the longitudinal direction. The term 'length' is used to describe the maximum longitudinal dimension of the element. The term 'width' is used to describe the maximum transverse dimension of the element.

The storage portion may be any suitable shape and size. The storage portion may have a substantially circular cross section. The storage portion may comprise a housing. The housing may be a rigid housing. Where the element comprises an aerosol generator, the rigid housing of the storage portion may provide mechanical support to the aerosol generator.

The element may comprise aerosol-forming substrate held in the storage portion. An aerosol-forming substrate is a substrate capable of releasing volatile compounds that can form an aerosol. The volatile compounds may be released by heating the aerosol-forming substrate. The volatile compounds may be released by moving the aerosol-forming substrate through passages of a vibratable element.

The aerosol-forming substrate may be liquid. The aerosol-forming substrate may be solid. The aerosol-forming substrate may comprise both liquid and solid elements. The aerosol-forming substrate may comprise nicotine. The nicotine containing liquid aerosol-forming substrate may be a nicotine salt matrix. The aerosol-forming substrate may comprise plant-based material. The aerosol-forming substrate may comprise tobacco. The aerosol-forming substrate may comprise a tobacco-containing material containing volatile tobacco flavour compounds, which are released from the aerosol-forming substrate upon heating. The aerosol-forming substrate may comprise homogenized tobacco material. The aerosol-forming substrate may comprise a non-tobacco-containing material. The aerosol-forming substrate may comprise homogenized plant-based material.

The aerosol-forming substrate may comprise at least one aerosol-former. An aerosol-former is any suitable known compound or mixture of compounds that, in use, facilitates formation of a dense and stable aerosol and that is substantially resistant to thermal degradation at the temperature of operation of the system. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Aerosol formers may be polyhydric alcohols or mixtures thereof, such as triethylene glycol, 1,3-butanediol and glycerine. The liquid aerosol-forming substrate may comprise other additives and ingredients, such as flavourants.

The aerosol forming substrate may be a liquid at room temperature. The liquid may comprise water, solvents, ethanol, plant extracts and natural or artificial flavours. The liquid may comprise one or more aerosol formers. Examples of suitable aerosol formers include glycerine and propylene glycol.

The storage portion may be configured such that aerosol-forming substrate held in the storage portion is protected from ambient air. The storage portion may be configured such that aerosol-forming substrate stored in the storage portion is protected from light. This may reduce the risk of degradation of the substrate. This may also maintain a high level of hygiene.

The storage portion may comprise a carrier material within the housing for holding the liquid aerosol-forming substrate. The liquid aerosol-forming substrate may be adsorbed or otherwise loaded onto the carrier material. The carrier material may be made from any suitable absorbent plug or body, for example, a foamed metal or plastics material, polypropylene, terylene, nylon fibers or ceramic. The aerosol-forming substrate may be retained in the carrier material prior to use of the aerosol-generating system. The aerosol-forming substrate may be released into the carrier material during use. The aerosol-forming substrate may be released into the carrier material immediately prior to use. For example, the liquid aerosol-forming substrate may be provided in a capsule. The shell of the capsule may melt upon heating by the heating means and releases the liquid aerosol-forming substrate into the carrier material. The capsule may contain a solid in combination with the liquid.

The liquid aerosol-forming substrate may be held in a capillary material. A capillary material is a material that actively conveys liquid from one end of the material to another. The capillary material may be oriented in the housing to convey liquid aerosol-forming substrate to an atomizer of the aerosol-generating system. The capillary material may have a fibrous structure. The capillary material may have a spongy structure. The capillary material may comprise a bundle of capillaries. The capillary material may comprise a plurality of fibers. The capillary material may comprise a plurality of threads. The capillary material may comprise fine bore tubes. The fibers, threads or fine-bore tubes may be generally aligned to convey liquid to an atomizer. The capillary material may comprise a combination of fibers, threads and fine-bore tubes. The capillary material may comprise sponge-like material. The capillary material may comprise foam-like material. The structure of the capillary material may form a plurality of small bores or tubes, through which the liquid can be transported by capillary action.

The capillary material may comprise any suitable material or combination of materials. Examples of suitable materials are a sponge or foam material, ceramic- or graphite-based materials in the form of fibres or sintered powders, foamed metal or plastics materials, a fibrous material, for example made of spun or extruded fibres, such as cellulose acetate, polyester, or bonded polyolefin, polyethylene, terylene or polypropylene fibres, nylon fibres or ceramic. The capillary material may have any suitable capillarity and porosity so as to be used with different liquid physical properties. The liquid aerosol-forming substrate has physical properties, including but not limited to viscosity, surface tension, density, thermal conductivity, boiling point and atom pressure, which allow the liquid to be transported through the capillary material by capillary action. The capillary material may be configured to convey the aerosol-forming substrate to the aerosol generator.

The element may comprise one or more air passages. The one or more air passages may extend through the storage portion. The storage portion may comprise a substantially annular space surrounding the one or more air passages. The one or more air passages may be formed by one or more conduits extending through the storage portion. The one or more conduits may be rigid. The one or more conduits may be substantially fluid impermeable. The storage portion may comprise a substantially annular space surrounding the one or more conduits.

At least a portion of the one or more conduits may be fluid permeable. As used herein with reference to the present invention, a 'fluid permeable' portion means a portion allowing liquid or gas to permeate through it. The one or more conduits may have one or more openings to allow fluid to permeate through it. In particular, the fluid permeable portion or the one or more openings may allow the aerosol-forming substrate, in either liquid phase, gaseous phase or both gaseous and liquid phase, to permeate through it.

The element may comprise an aerosol generator. The aerosol generator may be arranged to receive aerosol-forming substrate from the storage portion. The aerosol generator may be an atomizer. The aerosol generator may comprise one or more aerosol-generating elements. The aerosol generator may be configured to atomize received aerosol-forming substrate using heat. The aerosol generator may comprise heating means for atomizing received aerosol-generating substrate. The one or more aerosol-generating elements may be heating elements. The aerosol generator may be configured to atomize received aerosol-forming substrate using ultrasonic vibrations. The aerosol generator may comprise an ultrasonic transducer. The one or more aerosol-generating elements may comprise one or more vibratable elements.

Where the element comprises one or more air passages, at least a portion of the aerosol generator may extend into one or more of the one or more air passages to generate atomized aerosol-forming substrate in the one or more air passages. At least a portion of the one or more aerosol-generating elements may be arranged in the one or more air passages.

The aerosol generator may comprise heating means configured to heat the aerosol-forming substrate. The heating means may comprise one or more heating elements. The one or more heating elements may be arranged appropriately so as to most effectively heat received aerosol-forming substrate. The one or more heating elements may be arranged to heat the aerosol-forming substrate primarily by means of conduction. The one or more heating elements may be arranged substantially in directly contact with the aerosol-forming substrate. The one or more heating elements may be arranged to transfer heat to the aerosol-forming substrate via one or more heat conductive elements. The one or more heating elements may be arranged to transfer heat to ambient air drawn through the element during use, which may heats the aerosol-forming substrate by convection. The one or more heating elements may be arranged to heat the ambient air before it is drawn through the aerosol-forming substrate. The one or more heating elements may be arranged to heat the ambient air after it is drawn through the aerosol-forming substrate.

The heating means may be electric heating means or an electric heater. The electric heater may comprise one or more electric heating elements. The one or more electric heating elements may comprise an electrically resistive material. Suitable electrically resistive materials may include: semiconductors such as doped ceramics, electrically "conductive" ceramics (such as, for example, molybdenum disilicide), carbon, graphite, metals, metal alloys and composite materials made of a ceramic material and a metallic material.

The one or more electric heating elements may take any suitable form. For example, the one or more electric heating elements may take the form of one or more heating blades. The one or more electric heating elements may take the form of a casing or substrate having different electro-conductive portions, or one or more electrically resistive metallic tubes. The storage portion may incorporate one or more disposable heating elements. The one or more electric heating elements may comprise one or more heating needles or rods that run through the aerosol-forming substrate. The one or more electric heating elements may comprise one or more flexible sheets of material. The electric heating means may comprise one or more heating wires or filaments, for example Ni—Cr, platinum, tungsten or alloy wires, or heating plates. The one or more heating elements may be deposited in or on a rigid carrier material.

The one or more heating elements may comprise one or more heat sinks, or heat reservoirs. The one or more heat sinks or heat reservoirs may comprise a material configured to absorb and store heat and subsequently release the heat over time to heat the aerosol-forming substrate. The one or more heat sinks may be formed of any suitable material, such as a suitable metal or ceramic material. The material may have a high heat capacity (sensible heat storage material), or may be a material configured to absorb and subsequently release heat via a reversible process, such as a high temperature phase change. Suitable sensible heat storage materials include silica gel, alumina, carbon, glass mat, glass fibre, minerals, a metal or alloy such as aluminium, silver or lead, and a cellulose material such as paper. Other suitable materials which release heat via a reversible phase change include paraffin, sodium acetate, naphthalene, wax, polyethylene oxide, a metal, metal salt, and a mixture of eutectic salts or an alloy.

The aerosol generator may comprise one or more vibratable elements and one or more actuators arranged to excite vibrations in the one or more vibratable elements. The one or more vibratable elements may comprise a plurality of passages through which aerosol-forming substrate may pass and become atomized. The one or more actuators may comprise one or more piezoelectric transducers.

The aerosol generator may comprise one or more capillary wicks for conveying liquid aerosol-forming substrate held in the storage portion to the one or more elements of the aerosol generator. The liquid aerosol-forming substrate may have physical properties, including viscosity, which allow the liquid to be transported through the one or more capillary wicks by capillary action. The one or more capillary wicks may have any of the properties of structures described above relating to the capillary material.

The one or more capillary wicks may be arranged to contact liquid held in the liquid storage portion. The one or more capillary wicks may extend into the storage portion. In this case, liquid may be transferred from the storage portion to the one or more elements of the aerosol generator by capillary action in the one or more capillary wicks. The one or more capillary wicks may have a first end and a second end. The first end may extend into the storage portion to draw liquid aerosol-forming substrate held in the liquid storage portion into the aerosol generating means. The second end may extend into the one or more air passages.

The second end may comprise one or more aerosol-generating elements. The first end and the second end may extend into the liquid storage portion. One or more aerosol-generating elements may be arranged at a central portion of the wick between the first and second ends. When the one or more aerosol-generating elements are activated, the liquid aerosol-forming substrate in the one or more capillary wicks is atomized at and around the one or more aerosol-generating elements.

Where the element comprises one or more air passages, at least a portion of the aerosol generator may extend into one or more of the one or more air passages. Where the one or more air passages are formed by one or more conduits, the one or more capillary wicks may extend through the one or more conduits into the one or more air passages at the one or more openings. Atomized aerosol-forming substrate may be mixed with and carried in air flow through the one or more air passages. The capillary properties of the one or more capillary wicks, combined with the properties of the liquid substrate, may ensure that, during normal vaping when there is sufficient aerosol-forming substrate, the wick is always wet with liquid aerosol-forming substrate in the area at towards the heating or vibratable elements of the aerosol generator.

The aerosol generator may comprise one or more heating wires or filaments encircling a portion of one or more capillary wicks. The heating wire or filament may support the encircled portion of the one or more capillary wicks.

At least one example embodiment related to an aerosol-generating system comprising an element substantially as described in relation to at least one example embodiment as set forth above. The disabling mechanism may be configured to render the aerosol-generating system irreversibly inoperable. The element may be an integral part of an aerosol-generating system. The element may be integrally formed with the aerosol-generating system. The element may be fixed to other elements of the aerosol-generating system. The aerosol-generating system may be an electrically operated smoking system.

The aerosol-generating system may comprise a power supply. The power supply may be a battery. The battery may be a Lithium based battery, for example a Lithium-Cobalt, a Lithium-Iron-Phosphate, a Lithium Titanate or a Lithium-Polymer battery. The battery may be a Nickel-metal hydride battery or a Nickel cadmium battery. The power supply may be another form of charge storage device such as a capacitor. The power supply may require recharging and be configured for many cycles of charge and discharge. The power supply may have a capacity that allows for the storage of enough energy for one or more smoking experiences; for example, the power supply may have sufficient capacity to allow for the continuous generation of aerosol for a period of around six minutes, corresponding to the typical time taken to smoke a conventional cigarette, or for a period that is a multiple of six minutes. In another example, the power supply may have sufficient capacity to allow for a predetermined number of puffs or discrete activations of the heating means and actuator.

The aerosol-generating system may comprise a control system configured to operate the aerosol generator. The control system may comprise electric circuitry connected to the aerosol generator and the power supply. The electric circuitry may comprise a microprocessor, which may be a programmable microprocessor. The electric circuitry may comprise further electronic elements. The electric circuitry may be configured to regulate a supply of power to the aerosol generator. Power may be supplied to the aerosol generator continuously following activation of the system or may be supplied intermittently, such as on a puff-by-puff basis. The power may be supplied to the aerosol generator in the form of pulses of electrical current.

The aerosol-generating system may comprise a temperature sensor in communication with the control system. The temperature sensor may be adjacent to the storage portion of the element. The temperature sensor may be a thermocouple. At least one element of the aerosol generator may be used by the control system to provide information relating to the temperature. The temperature dependent resistive properties of the at least one element may be known, and the properties may be used to determine the temperature of the at least one element in a manner known to a person skilled in the art.

The aerosol-generating system may comprise a puff detector or a sensor in communication with the control electronics. The puff detector may be configured to detect when an adult vaper draws on the mouthpiece. The control electronics may be configured to control power to the aerosol generator in dependence on the input from the puff detector.

The aerosol-generating system may comprise an adult vaper input, such as a switch or button. This enables the adult vaper to turn the system on. The switch or button may activate the aerosol generator. The switch or button may initiate the aerosol generator and aerosol generation. The switch or button may prepare the control electronics to await input from the puff detector or the sensor.

The aerosol-generating system may comprise a housing. The housing may be elongate. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. The material may be light and non-brittle.

The housing may comprise a cavity for receiving the power supply. The housing may comprise a mouthpiece. The mouthpiece may comprise at least one air inlet and at least one air outlet. The mouthpiece may comprise more than one air inlet. One or more of the air inlets may reduce the temperature of the aerosol before it is delivered to an adult vaper and may reduce the concentration of the aerosol before it is delivered to an adult vaper.

The aerosol-generating system may be portable. The aerosol-generating system may have a size comparable to a cigar or cigarette. The aerosol-generating system may have a total length ranging from about 30 mm to about 150 mm. The aerosol-generating system may have an external diameter ranging from about 5 mm to about 30 mm.

The aerosol generating system may be an electrically operated smoking system. The aerosol-generating system may be an electronic cigarette or cigar.

The aerosol-generating system may comprise an aerosol-generating device and a cartridge.

At least one example embodiment relates to a cartridge for an aerosol-generating system. The cartridge comprises an element as described herein. The disabling mechanism may be configured to render the cartridge irreversibly inoperable.

The cartridge may have any suitable shape. The cartridge may be elongate. The cartridge may have any suitable cross-section. The cartridge may have a substantially circular, elliptical, hexagonal or octagonal cross-section. The cartridge may have a housing. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. The material may be light and non-brittle.

The cartridge may comprise the liquid storage portion. The liquid storage portion may comprise a housing for holding a liquid aerosol-forming substrate. The cartridge may comprise an aerosol generator configured to receive liquid aerosol-forming substrate from the liquid storage portion.

The storage portion, the housing, and the aerosol generator may comprise any features or be arranged in any configuration as described above. In at least one example embodiment, the housing may comprise a first housing part and a second housing part substantially as described above for operating the manually operated disabling mechanism.

The aerosol generator may comprise heating means substantially as described above. The heating means may be inductive heating means, such that no electrical contacts are formed between the cartridge and the device. The device may comprise an inductor coil and a power supply configured to provide high frequency oscillating current to the inductor coil. The cartridge may comprise a susceptor element positioned to heat the aerosol-forming substrate. As used herein, a high frequency oscillating current means an oscillating current having a frequency ranging from about 500 kHz to about 10 MHz.

The cartridge may be removably coupled to the aerosol-generating device. The cartridge may be removed from the aerosol-generating device when the aerosol-forming substrate has been consumed. The cartridge may be disposable. The cartridge may be reusable. The cartridge may be refillable with liquid aerosol-forming substrate. The cartridge may be replaceable in the aerosol-generating device. The aerosol-generating device may be reusable.

The cartridge may be manufactured at low cost, in a reliable and repeatable fashion. As used herein, the term 'removably coupled' is used to mean that the cartridge and device can be coupled and uncoupled from one another without significantly damaging either the device or cartridge.

The cartridge may be rendered irreversibly inoperable before disposable. The cartridge may be rendered irreversibly inoperable, but the aerosol-generating device may be retained as a reusable device because the aerosol-generating device may include more expensive elements than the cartridge, such as control circuitry.

The cartridge may have a simple design. The cartridge may have a housing within which an aerosol-forming substrate is held. The cartridge housing may be a rigid housing. The housing may comprise a material that is impermeable to liquid.

The cartridge may comprise a lid. The lid may be peelable before coupling the cartridge to the aerosol-generating device. The lid may be piercable.

The aerosol-generating device may comprise a cavity for receiving the cartridge. The aerosol-generating device may comprise a cavity for receiving the power supply.

The aerosol-generating device may comprise the aerosol generator. The aerosol-generating device may comprise one or more control systems of the aerosol-generating system. The aerosol-generating device may comprise the power supply. The power supply may be removably coupled to the aerosol-generating device.

The aerosol-generating device may comprise the mouthpiece. The mouthpiece may comprise at least one air inlet and at least one air outlet. The mouthpiece may comprise more than one air inlet.

The aerosol-generating device may comprise a piercing element for piercing the lid of the cartridge. The mouthpiece may comprise the piercing element. The mouthpiece may comprise at least one first conduit extending between the at least one air inlet and a distal end of the piercing element. The mouthpiece may comprise at least one second conduit extending between a distal end of the piercing element and the at least one air outlet. The mouthpiece may be arranged such that in use, when an adult vaper draws on the mouthpiece, air flows along an air passage extending from the at least one air inlet, through the at least one first conduit, through a portion of the cartridge, through the at least one second conduit and exits the at least one outlet. This may improve airflow through the aerosol-generating device and enable the aerosol to be delivered to the adult vaper more easily.

An adult vaper may insert a cartridge, as described herein, into the cavity of an aerosol-generating device. The adult vaper may attach the mouthpiece to the main body of the aerosol-generating device, which may pierce the cartridge with the piercing portion. The adult vaper may activate the device by pressing the switch or the button. The adult vaper may draw on the mouthpiece, which draws air into the device through the one or more air inlets. The air may pass over a portion of the aerosol generator, entraining atomized aerosol-forming substrate, and exit the device through the air outlet in the mouthpiece.

A kit of parts may be provided, comprising a cartridge, an aerosol generator and an aerosol-generating device, substantially as described above. An aerosol-generating system according to at least one example embodiment may be provided by assembling the cartridge, the aerosol generator and the aerosol-generating device. The elements of the kit of parts may be removably connected. The elements of the kit of parts may be interchangeable. Elements of the kit of parts may be disposable. Elements of the kit of parts may be reusable.

Features described in relation to one example embodiment may also be applicable to other example embodiments. Features described in relation to an element may be applicable to a cartridge or an aerosol-generating system. Features described in relation to a cartridge may be applicable to an element or an aerosol-generating system. Features described in relation to an aerosol-generating system may be applicable to an element or a cartridge.

FIG. 1 is a schematic view of an aerosol-generating system 1 according to at least one example embodiment. The aerosol-generating system 1 shown in FIG. 1 is an electrically operated smoking system. FIG. 1 is schematic in nature. The elements shown are not necessarily to scale either individually or relative to one another.

In at least one example embodiment, the aerosol-generating system 1 comprises an aerosol-generating device 2 in cooperation with an element 10. The element 10 is a cartridge for the aerosol-generating device 2. The aerosol-generating device 2 may be reusable. The element 10 may be disposable.

The aerosol-generating device 2 comprises an elongate, substantially circularly cylindrical housing 3, having a longitudinal length of about 100 mm and an external diameter of about 20 mm, comparable to a cigar. The housing 3 has a body end 4 and a mouthpiece end 5. An electrical power supply 6, in the form of a rechargeable lithium battery, and a control system 7, comprising control electronics and a microprocessor, are arranged in the body end 4. A puff detection system (not shown) is also provided with the control system 7. A cavity 8 is formed in the mouthpiece end 5, in which the element 10 is received. The cavity 8 is substantially separated from the power supply 6 and the control system 7 in the body end 4 by a partition wall 9, which substantially shields the power supply 6 and the control system 7 from heat and the by-products generated by the element 10 in operation of the aerosol-generating system 1.

An air inlet 24 and an air outlet 26 are provided in the mouthpiece end 5 to enable ambient air to be drawn through the cavity 8. A further air inlet 28 is provided in the body end 4, proximate to the puff detection system (not shown), and an air inlet 30 is provided in the partition wall 9 to enable air to be drawn through the body portion 4, past the puff detection system, from the mouthpiece end 5.

The element 10 comprises a substantially circularly cylindrical housing 11, having substantially closed ends. An air inlet is formed in one of the substantially closed ends and an air outlet is formed in the other substantially closed end to enable air to be drawn through the element. The element housing 11 also comprises keying features (not shown) to substantially prevent the element 10 from being received in the cavity 8 upside-down.

A liquid storage portion 12 is contained within the element housing 11. The liquid storage portion 12 comprises a substantially circularly cylindrical housing 13 that is rigid and substantially fluid impermeable. The liquid storage portion 12 contains a carrier material 14 that holds a liquid aerosol-forming substrate. A conduit 20 extends through the liquid storage portion housing 13, substantially coaxially along the length of the housing 13. The liquid storage portion 12 forms a substantially annular, circularly cylindrical chamber around the conduit 20. The conduit 20 has open ends that are substantially aligned with the air inlet and the air outlet of the element housing 11. This provides a substantially linear air passage 22 through the element 10.

The element 10 further comprises an aerosol generator 15 comprising a capillary wick 16 and an electric coil heater 18. The capillary wick 16 comprises a plurality of fibers, which are generally aligned from a first end to a second end of the wick 16. The capillary wick 16 spans the width of the air passage 22. A central portion of the wick 16 extends transversely across the air passage 22, and the first and second ends of the wick 16 extend through the conduit 20 and into the carrier material 14. The electrical coil heater 18 encircles the central portion of the wick 16, and is arranged within the air passage 22. The electrical coil heater 18 is electrically connected to the power supply 5 and the control system 6 of the device 2 by an electrical circuit (not shown). The electrical circuit comprises one or more electrical contacts which align with one or more complimentary contacts of the device 2 when the element 10 is received in the cavity 8.

In at least one example embodiment (not shown), the element 10 may be electrically connected to the device 2 by induction, the device comprising an inductor coil and the element 10 comprising a susceptor element arranged to electrically couple with the inductor coil when the element 10 is received in the cavity 8.

During vaporizing, liquid aerosol-forming substrate held in the carrier material 14 in the liquid storage portion 12 is conveyed by capillary action from the carrier material 14 into the first and second ends of the wick 16, towards the central portion. When an adult vaper draws on the aerosol-generating device 2 at the mouthpiece end 5, ambient air is drawn into the cavity 8 through air inlet 24, through the element 10 along air passage 22, and out of air outlet 26. A small amount of ambient air is also drawn through air inlet 28 in the body end 4 of the aerosol-generating device 2, and into the cavity 8 via the air inlet 30 in the partition wall 9. This small amount of air triggers the puff detection system, and on detecting a puff, the control system 6 activates the power supply 6, which supplies electrical energy to the coil heater 18, which heats the central portion of the wick 16 and vaporizes the liquid aerosol-forming-substrate in the central portion to form a vapor. The heated aerosol-forming substrate evaporates to form a supersaturated vapor in the air passage 22. Liquid aerosol-forming substrate that is vaporized from the wick 16 is replaced in the central portion of the wick by further liquid aerosol-forming substrate moving along the wick 16 by capillary action (this is sometimes referred to as 'pumping action'). The supersaturated vapor generated by the aerosol generator 15 is entrained in the airflow through the air passage 22. As the supersaturated vapor cools, the vapor condenses to form an inhalable aerosol, which is carried in the airflow through the air passage 22, out of the air outlet 26 and to the mouth of the adult vaper for inhalation.

In other examples (not shown), the mouthpiece end 5 comprises additional air inlets, downstream of the aerosol generator 15, to draw in additional cool air to mix with the vaporized aerosol-forming substrate and to cool the vapor and aerosol before it reaches the adult vaper.

In at least one example embodiment (not shown), the aerosol generator 15 comprises a capillary wick 16 having only a first end that extends into the liquid storage portion 12, and a second end that extends into the air passage and encircles the coil heater 18.

In at least one example embodiment (not shown), the element 10 is not a cartridge, and the parts of the element 10 are integral with parts of the aerosol-generating device 2. In at least one example embodiment (not shown), the aerosol-generating system is configured to be disposable. In another example embodiment (not shown), the aerosol-generating device 2 comprises a valve to enable refilling of the liquid storage portion 12 with liquid aerosol-forming substrate.

The element 10 does not comprise a manually operated disabling mechanism according to at least one example embodiment.

Figure 2:
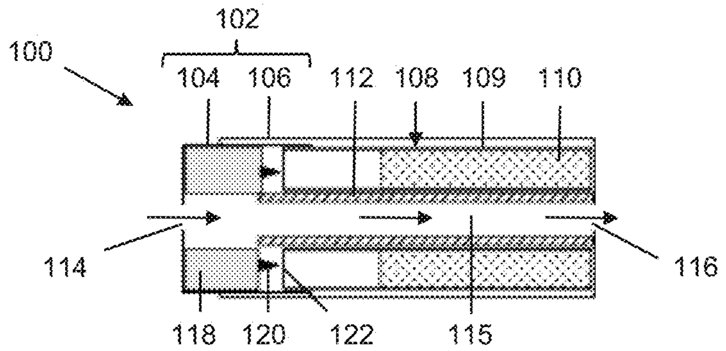
FIG. 2 is a cross-section of a cartridge for an electrically operated smoking system according to at least one example embodiment.
Figure 3:
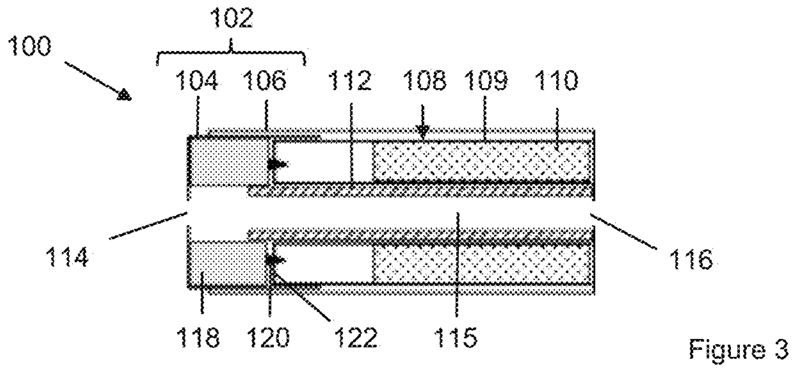
FIG. 3 is a cross-section of the cartridge of FIG. 2, wherein the disabling mechanism has been operated to render the cartridge irreversibly inoperable according to at least one example embodiment.

Referring to FIGS. 2 and 3, there is shown an element 100 according to at least one example embodiment. The element 100 comprises a manually operated disabling mechanism configured to render a storage portion of the element irreversibly inoperable.

The element 100 is a cartridge for an aerosol-generating device, such as the aerosol-generating device 2 shown in FIG. 1. The element 100 does not comprise an aerosol generator. Aerosol-generators may be provided in the cavity of the aerosol-generating device, or may be removably couplable to at least one of the element and the aerosol-generating device.

The element 100 comprises a rigid housing 102 comprising two housing parts, a first housing part 104 and a second housing part 106. The first housing part 104 and the second housing part 106 have the same basic shape. The first housing part 104 and the second housing part 106 are substantially circularly cylindrical, and comprise a first end that is substantially closed and a second end that is substantially open. The substantially closed end of the first housing part 104 comprises an air inlet 114 and the substantially closed end of the second housing part 106 comprises an air outlet 116. The width of the first housing part 104 is slightly smaller than the width of the second housing part, such that the first housing part may be received in the second housing part with an interference fit. The interference fit makes pushing the first part into the second part difficult for an adult vaper.

The second housing part 106 comprises a liquid storage portion 108 and a conduit 112 forming an air passage 115, substantially as described in the element 10 shown in FIG. 1. The liquid storage portion 108 comprises a rigid housing 109 forming a substantially annular, circularly cylindrical chamber about the conduit 112. The liquid storage portion housing 109 comprises a frangible portion 122 arranged towards the open end of the second housing part 106. The liquid storage portion 108 does not contain a carrier material. Liquid aerosol-forming substrate 110 is held freely within the liquid storage portion 108.

The first housing part 104 comprises a secondary storage portion 118. The secondary storage portion 118 comprises an annular, circularly cylindrical body of sponge material. The outer diameter of the secondary storage portion 118 is similar to that of the liquid storage portion 108, and the inner diameter is similar to the air passage 115. The first housing part 104 also comprises two piercing elements 120. The two piercing elements 120 are conical spikes formed of a rigid polymeric material. The bases of the conical spikes are adhered to the body of sponge material, and central passages (not shown) pass through each piercing element from the piercing tip to the base at the body of sponge material.

The first housing part 104 is arranged substantially in coaxial alignment with the second housing part 106, with the open end of the first housing part 104 received in the open end of the second housing part 106. The first housing part 104 and the second housing part 106 form a substantially circularly cylindrical housing 102. In this arrangement, the air inlet 114, the air passage 115 and the air outlet 116 are aligned to form a substantially linear air passage through the element 100.

The element 100 comprises a manually operated disabling mechanism for rendering the liquid storage portion irreversibly inoperable. The disabling mechanism comprises at least the first housing part 104, the second housing part 106, the secondary storage portion 118, the piercing elements 120 and the frangible portion 122 of the liquid storage portion 108.

The element 100 is shown in an operating arrangement in FIG. 2, wherein the manually operated disabling mechanism has not been operated by an adult vaper. In the operating arrangement, the element 100 is operable with an aerosol-generating device substantially as described in relation to element 10 and device 2 shown in FIG. 1. In the operating arrangement, the first housing part 104 extends substantially out of the open end of the second housing part 106, and the piercing elements 120 are spaced from the frangible portion 122 of the liquid storage portion 108, with the piercing tips facing the frangible portion 122.

To operate the disabling mechanism, an adult vaper presses the first housing part 104 towards the second housing part 106, substantially along the longitudinal axis of the element 100. As the first housing part 104 is advanced into the second housing part 106, the piercing elements 120 are moved towards the liquid storage portion 108 and the piercing tips pierce the frangible portion 122 of the liquid storage portion 108. The central passages of the piercing elements 120 provide passages between the liquid storage portion 108 and the secondary storage portion 118 for fluid communication.

The disabling mechanism may be operated by orienting the element 100 with the first housing part 104 below the second housing part 106, and 'stubbing' the element 100 against a horizontal surface to press the first housing part 104 into the second housing part 106. In this orientation, gravity may urge the liquid aerosol-forming substrate 110 towards the secondary storage portion 118. However, to the further aid in drawing liquid aerosol-forming substrate from the liquid storage portion 108 to the secondary storage portion 118, the passages of the piercing elements 120 may be sized to draw liquid aerosol-forming substrate into the secondary storage portion by capillary action or capillary material may be provided in the passages of the piercing elements 120.

The element 100 is shown in a disabling arrangement in FIG. 3. In the disabling arrangement, the disabling mechanism of the element 100 has been operated and the element has been rendered irreversibly inoperable.

In the disabling arrangement, liquid aerosol-forming substrate 110 held in the liquid storage portion 108 passes through the passages of the piercing elements 120 and is absorbed by the body of sponge material in the secondary storage portion 118. The liquid aerosol-forming substrate 110 is collected in the secondary storage portion 118 and is retained in the secondary storage portion 118 by the sponge material. This substantially prevents the liquid aerosol-forming substrate 110 from moving from the secondary storage portion 118 back to the liquid storage portion 108. This renders the liquid storage portion 108 irreversibly inoperable. The liquid aerosol-forming substrate 110 is also substantially prevented from being received by the aerosol generator of an aerosol-generating device. This renders the element 200 irreversibly inoperable with an aerosol-generating device.

In the disabling arrangement, the element 100 is also arranged to render the first housing part 104 substantially inaccessible to an adult vaper. As shown in FIG. 3, on operation of the disabling mechanism, the closed end of the first housing part 104 is arranged substantially flush with the open end of the second housing part 102. In this arrangement, the first housing part 104 is substantially contained within the second housing part 106, and an adult vaper is substantially prevented from grasping the first housing part 104. This substantially prevents an adult vaper from moving the first housing part 104 from the disabling arrangement to the operating arrangement.

In other example embodiments (not shown) the element 100 is not a cartridge, and the parts of the element 100 are integral with parts of an aerosol-generating device. In such example embodiments, the first and second housing parts of the element are first and second housing parts of a housing of the aerosol-generating system, and an adult vaper may 'stub' the aerosol-generating system to operate the disabling mechanism, in a similar manner to extinguishing a cigar or cigarette.

Figure 4:
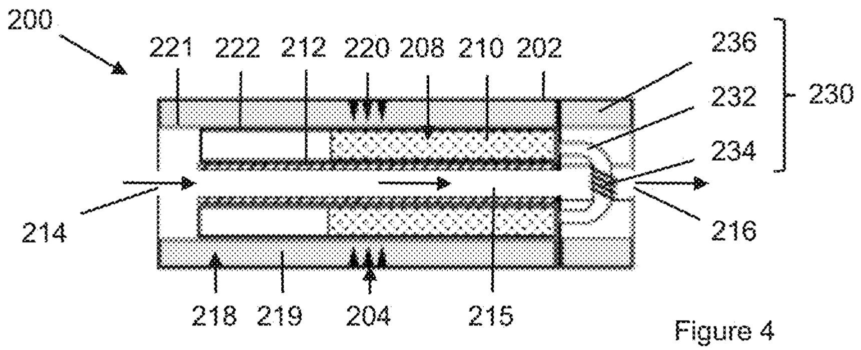
FIG. 4 is a cross-section of a cartridge for an electrically operated smoking system according to at least one example embodiment.
Figure 5:
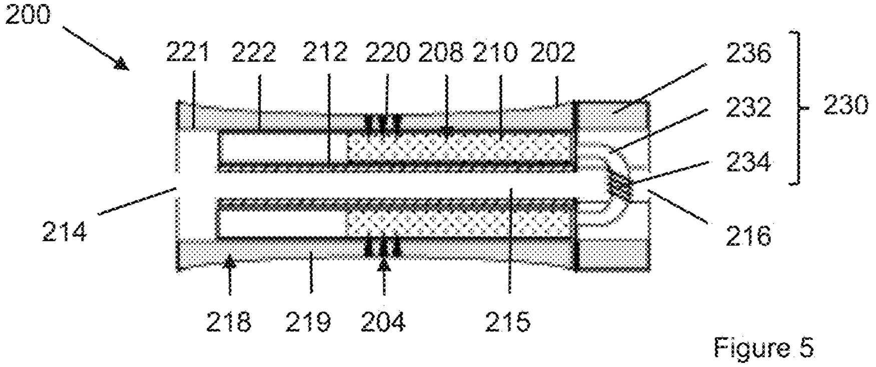
FIG. 5 is a cross-section of the cartridge of FIG. 4 wherein the disabling mechanism has been operated to render the cartridge irreversibly inoperable according to at least one example embodiment.

Referring to FIGS. 4 and 5, there is shown an element 200 according to at least one example embodiment. The element 200 comprises manually operated disabling mechanism configured to render the liquid storage portion of the element irreversibly inoperable.

The element 200 is a cartridge for an aerosol-generating device, and has a similar size and shape to the element 100 shown in FIGS. 2 and 3. In at least one example embodiment, the element 200 comprises a liquid storage portion 208, a conduit 212, and an air passage 215, arranged similarly to the corresponding elements of element 100 described above and shown in FIGS. 2 and 3. The liquid aerosol-forming substrate 210 is held freely in the liquid storage portion 208.

The element 200 comprises an aerosol generator 230. The aerosol generator 230 is similar to the aerosol generator 15 of the element 10 shown in FIG. 1, and comprises a capillary wick 232 and an electric coil heater 234. The aerosol generator 230 is arranged in abutting coaxial alignment with the liquid storage portion 208, and first and second ends of the wick 232 extend into the abutting end of the liquid storage portion 208. An annular guard 236 is secured to the abutting end of the liquid storage portion 208 and substantially surrounds the wick 232 and coil 234. In other example embodiments (not shown), the aerosol generator 230 may be removably coupled to the liquid storage portion 208 or the element 200.

The element 200 comprises a housing 202 containing the liquid storage portion 208 and the aerosol generator 230. The element housing 202 comprises a single housing part that is substantially circularly cylindrical and substantially closed at both ends. An air inlet 214 is provided at the end furthest from the aerosol generator 230 and an air outlet 216 is provided at the end nearest the aerosol generator 230. The air inlet 214, the air passage 215 and the air outlet 216 are substantially aligned to provide a substantially linear air passage through the element 200.

The element housing 202 comprises a manually deformable portion 204 at a central region along its length. The manually deformable portion 204 comprises a region having a reduced thickness. The reduced thickness of the manually deformable portion may weaken the structure of the housing 202 at the manually deformable portion 204. This may enable an adult vaper to deform the manually deformable portion 204 under compression.

A secondary storage portion 218 is arranged within the housing 202, between the liquid storage portion 208 and the housing 202. The secondary storage portion 218 is arranged radially outwardly of the liquid storage portion 208, and substantially surrounds the liquid storage portion 208 along its length. The secondary storage portion 218 comprises a rigid housing 221, similar to the housing of the liquid storage portion 208. The secondary storage portion 218 contains particles of a superabsorbent polymer (SAP) material 219.

Piercing elements 220 are secured to an inner surface of the housing 202. The piercing elements 220 comprise pairs of opposing arcuate cutting blades, spaced about the circumference of the housing 202. Each of the blades has a cutting edge that is arranged to face radially inwardly.

The element 200 comprises a manually operated disabling mechanism configured to render the liquid storage portion irreversibly inoperable. The disabling mechanism comprises at least the manually deformable portion 204 of the housing 202, the secondary storage portion 218 comprising the SAP material 219 and the piercing elements 220.

The element 200 is shown in an operating arrangement in FIG. 4, wherein the manually operated disabling mechanism has not been operated by an adult vaper. In the operating arrangement, the element 200 is operable with an aerosol-generating device substantially as described in relation to element 10 and device 2 shown in FIG. 1.

In the operating arrangement, the piercing elements are arranged within the secondary storage portion 218, spaced from the inner wall 221 of the secondary storage portion and the outer wall 222 of the liquid storage portion 208.

To operate the disabling mechanism, an adult vaper may compress opposite sides of the manually deformable portion 204 towards the center of the element 200. As the manually deformable portion 204 is compressed, piercing elements 220 are advanced towards the inner wall 221 of the secondary storage portion 218 and the outer wall 222 of the liquid storage portion 208. The cutting edges of the piercing elements 220 pierce the inner wall 221 and the outer wall 222. This enables fluid communication between the liquid storage portion 208 and the secondary storage portion 218 and releases the SAP material 219 from the secondary storage portion 218 into the liquid storage portion 208.

The element 200 is shown in a disabling arrangement in FIG. 5. In the disabling arrangement, the disabling mechanism of the element 200 has been operated and the element has been rendered irreversibly inoperable.

In the disabling arrangement, liquid aerosol-forming substrate 210 held in the liquid storage portion 208 comes into contact with the released SAP material 219, and is absorbed by the SAP material 219. The liquid aerosol-forming substrate is retained by the SAP material 219. This renders the liquid storage portion 208 unsuitable for holding liquid aerosol-forming substrate 210 and renders the liquid storage portion irreversibly inoperable. The liquid aerosol-forming substrate 210 is also substantially prevented from being received by the aerosol generator 230 as it is retained in the SAP material 219. This renders the element 200 irreversibly inoperable with an aerosol-generating device.

In other example embodiments (not shown), the SAP material may be retained in the secondary storage portion 218 and the liquid aerosol-forming substrate 210 may be conveyed from the liquid storage portion 208 to the secondary storage portion 218.

Figure 6:
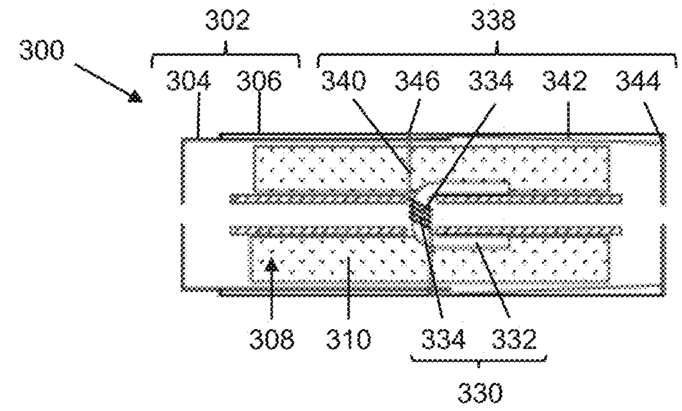
FIG. 6 is a cross-section of a cartridge according to at least one example embodiment.
Figure 7:
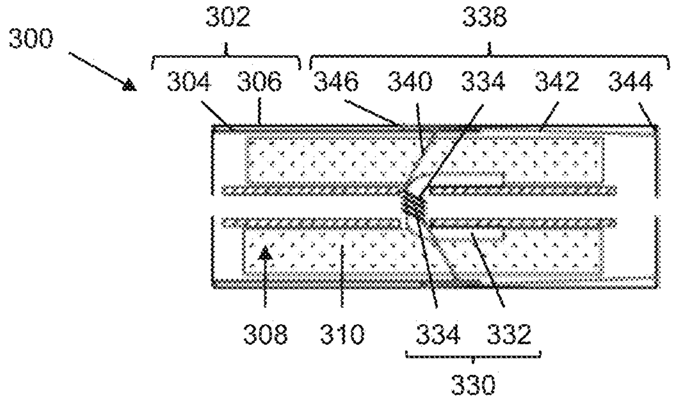
FIG. 7 is a cross-section of the cartridge of FIG. 6 wherein the disabling mechanism has been operated to render the cartridge irreversibly inoperable according to at least one example embodiment.

Referring to FIGS. 6 and 7, there is shown an element 300 according to at least one example embodiment. The element 300 comprises a manually operated disabling mechanism configured to render aerosol generator of the element irreversibly inoperable.

The element 300 is a cartridge for an aerosol-generating device, and has a similar size and shape to the element 100 shown in FIGS. 2 and 3. In at least one example embodiment, the element 300 comprises a liquid storage portion 308, a conduit 312, and a housing 302 comprising first and second housing parts 304, 306, arranged similarly to the corresponding parts of the element 100.

Liquid storage portion 308 comprises a carrier material 310 containing liquid aerosol-forming substrate.

The element 300 comprises aerosol generator 330. The aerosol generator 330 comprises a capillary wick 332 and an electrical coil heater 334 arranged similarly to the aerosol generator 15 of the element 10 shown in FIG. 1. The electrical coil heater 334 is electrically connected to the control system and power source of an aerosol-generating device by an electrical circuit 338. The electrical circuit 338 comprises an arrangement of wires extending from both ends of the coil heater 334. Each arrangement of wires comprises a first wire 340 connected to the coil heater 334 and a second wire 342 connected to an electrical contact 344 arranged on the second housing part 306. The first wire 340 and the second wire 342 are electrically connected by a frangible connection, comprising a soldered joint. When the element 300 is received in an aerosol-generating device, the contacts 346 align with complimentary contacts of the aerosol-generating device, and the electrical circuit 338 electrically connects coil heater 334 to a power supply and control system of the aerosol-generating device.

A portion of the first wires 340 is secured to the first housing part 304, and a portion of the second wires 342 is secured to the second housing part 306. The wires are secured to the element housing 302 via a layer of bonding material, such as an adhesive.

The element 300 comprises a manually operated disabling mechanism comprising at least the first housing part 304, the second housing part 306 and the frangible connections 344.

The element 300 is shown in an operating arrangement in FIG. 6. In the operating arrangement, the element 300 is operable with an aerosol-generating device substantially as described in relation to element 10 and device 2 shown in FIG. 1.

In the operating arrangement, the first housing part 304 extends substantially out of the open end of the second housing part 306 and the electrical circuit 338 is complete.

To operate the disabling mechanism, an adult vaper presses the first housing part 304 into the second housing part 306. As the first housing part 304 is advanced into the second housing part 306, the first wire 340 moves with the first housing part 304. The second wire 342 is not secured to the first housing part 304, and so the second wire 342 does not move with the first housing part 304. The relative movement of the first wires 342 and the second wires 344 applies tension to the frangible connections 346 and causes the frangible connections 346 to break.

The element 300 is shown in a disabling arrangement in FIG. 7. In the disabling arrangement, the disabling mechanism of the element 300 has been operated and the element has been rendered irreversibly inoperable.

In the disabling arrangement, the frangible connections 346 are broken, which means that the electrical circuit 338 connecting the coil heater 334 and the control system and power source of the aerosol-generating device is broken. This renders the aerosol generator 330 irreversibly inoperable and renders the element 300 irreversibly inoperable with an aerosol-generating device.

Figure 8:
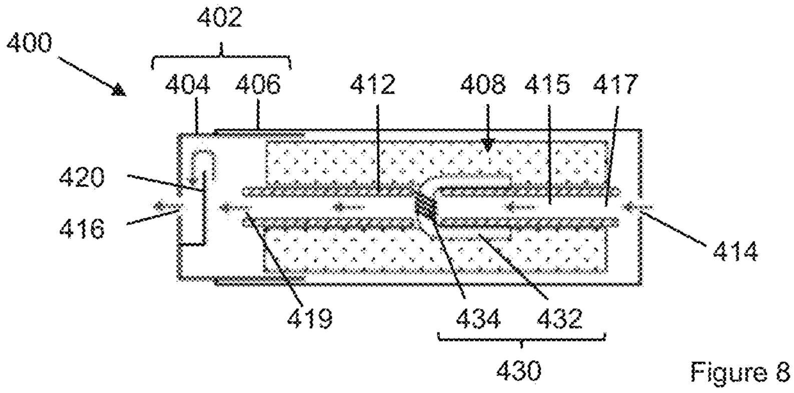
FIG. 8 is a cross-section of a cartridge according to at least one example embodiment.
Figure 9:
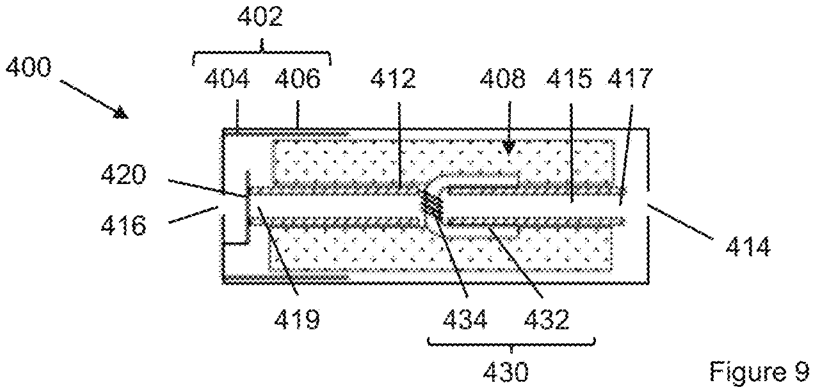
FIG. 9 is a cross-section of the cartridge of FIG. 8 wherein the disabling mechanism has been operated to render the cartridge irreversibly inoperable according to at least one example embodiment.

Referring to FIGS. 8 and 9, there is shown an element 400 according to at least one example embodiment. The element 400 comprises a manually operated disabling mechanism configured to render an air passage of the element irreversibly inoperable.

The element 400 is a cartridge for an aerosol-generating device, and has a similar size and shape to the element 300 shown in FIGS. 6 and 7. In at least one example embodiment, the element 400 comprises a liquid storage portion 408, a conduit 412, aerosol generator 430, and a housing 402. The housing 402 includes first and second housing parts 404, 406, arranged similarly to the corresponding parts of the element 300.

An air passage is formed through the element 400. The air passage comprises an air outlet 414 of the second housing part 406, air passage 415 of the conduit 412 and an air outlet 416 of the first housing part 404. The conduit 412 comprises an open end 417 arranged towards the air inlet 414 and an open end 419 arranged towards the air outlet 416.

A barrier 420 is secured to the first housing part 404 and is arranged between the air outlet 416 of the first housing part 404 and the open end 419 of the conduit 415. The barrier 420 is comprised of substantially gas-impermeable material, which may be the same material as the housing 402. The barrier 420 is substantially L-shaped. One end of the barrier 420 is secured to an inner face of the closed end of the first housing part 404, and is arranged to extend substantially in the longitudinal direction, substantially away from the closed end and towards the open end of the first housing part 404. The other end of the barrier 420, which extends substantially perpendicular to the first end, extends substantially transversely across the element. The transversely extending end is arranged between the air outlet 416 and the open end 419 of the conduit 412. The transversely extending end extends substantially across the path of the air passage through the element; however, the barrier 420 does not extend to the side of the first housing part 404. This provides a gap between the transversely extending end of the barrier 420 and the side of the first housing part 404.

The element 400 comprises a manually operated disabling mechanism comprising at least the first housing part 404, the second housing part 406 and the barrier 420.

The element 400 is shown in an operating arrangement in FIG. 8, wherein the manually operated disabling mechanism has not been operated by an adult vaper. In the operating arrangement, the element 400 is operable with an aerosol-generating device substantially as described in relation to element 10 and device 2 shown in FIG. 1.

In the operating arrangement, the first housing part 404 extends substantially out of the open end of the second housing part 406, and the barrier 420 is spaced from the opening 419 of the conduit 412 and from the air outlet 416 of the first housing part 404. This provides an passage along which air may flow from the opening 419 of the conduit 412, through the gap between the barrier 420 and the side of the first housing part 404 and out of the air outlet 416.

To operate the disabling mechanism, an adult vaper presses the first housing part 404 into the second housing part 406. The barrier 420 is advanced with the first housing part 404 towards the conduit 412 and is brought into abutment with the open end 419 of the conduit 412. In this arrangement, the barrier 420 substantially obstructs the open end 419 of the conduit 412.

The element 400 is shown in a disabling arrangement in FIG. 9. In the disabling arrangement, the disabling mechanism of the element 400 has been operated and the element 400 has been rendered irreversibly inoperable.

In the disabling arrangement, the barrier 420 substantially obstructs the open end 419 of the conduit 412. This blocks the air passage through the element and renders the air passage inoperable. Without an air passage to enable air to pass through the element 400, aerosol generated by the aerosol generator is unable to leave the element 400. This renders the element 400 inoperable with an aerosol-generating device.

As described for element 100 shown in FIG. 3, in the disabling arrangement, the first housing part 404 is substantially contained within the second housing part 406. This renders the first housing part 404 substantially inaccessible to the adult vaper. This renders air passage and the element 400 irreversibly inoperable.

In other example embodiments (not shown), the barrier 420 or the open end 419 of the conduit 412 may be provided with a layer of bonding material, such as adhesive, to secure the barrier 420 to the open end 419 of the conduit 420. This may render the element irreversibly inoperable.

Figure 10:
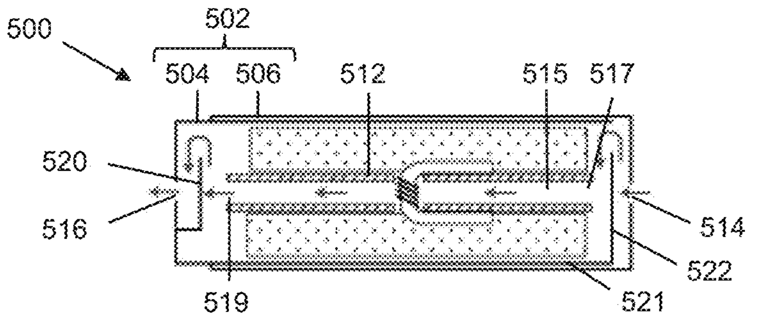
FIG. 10 is a cross-section of a cartridge according to at least one example embodiment.
Figure 11:
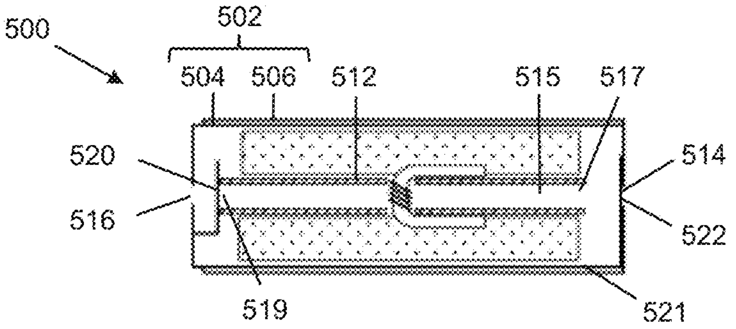
FIG. 11 is a cross-section of the cartridge of FIG. 10 wherein the disabling mechanism has been operated to render the cartridge irreversibly inoperable according to at least one example embodiment.

Referring to FIGS. 10 and 11, there is shown an element 500 according to at least one example embodiment. The element 500 comprises a manually operated disabling mechanism configured to render an air passage of the element irreversibly inoperable.

The element 500 is a cartridge for an aerosol-generating device, and is substantially identical to the element 400 shown in FIGS. 8 and 9. However, the element 500 comprises a first barrier 520 and a second barrier 522.

The first barrier 520 is substantially identical to the barrier 420 of element 400 shown in FIGS. 8 and 9. The second barrier 522 of the element 500 is substantially similar to first barrier 520; however, the second barrier 522 is secured to the first housing part 504 by an elongate sidewall 521, which extends between the second housing part 506 and the liquid storage portion 510. The second barrier 522 comprises a transversely extending end that is arranged between the air outlet 514 of the second housing part 506 and the other open end 517 of the conduit 512. The transversely extending end of the second barrier 522 extends substantially across the path of the air passage through the element; however, the second barrier 522 does not extend to the side of the second housing part 506. This provides a gap between the transversely extending end of the second barrier 522 and the side of the second housing part 506.

The element 504 comprises a manually operated disabling mechanism comprising at least the first housing part 504, the second housing part 506, the first barrier 520 and the second barrier 522.

The element 500 is shown in an operating arrangement in FIG. 10, wherein the manually operated disabling mechanism has not been operated by an adult vaper. In the operating arrangement, the element 500 is operable with an aerosol-generating device substantially as described in relation to element 10 and device 2 shown in FIG. 1.

In the operating arrangement, the second barrier 522 is spaced from the opening 517 of the conduit 512 and from the air inlet 514 of the second housing part 506. This provides a passage along which air may flow into the element 500 through air inlet 514, through the gap between the second barrier 522 and the second housing part 506 and into the opening 517 of the conduit 512. The first barrier 520 is spaced from the opening 519 of the conduit 512 and from the air outlet 516 of the first housing part 504. This provides a passage along which air may flow out of the element 500 from the opening 519 of the conduit 512, through the gap between the barrier 520 and the side of the first housing part 504 and out of the air outlet 516.

To operate the disabling mechanism, an adult vaper presses the first housing part 504 into the second housing part 506. The first barrier 520 is advanced with the first housing part 504 towards the conduit 512 and is brought into abutment with the open end 519 of the conduit 512. The second barrier 522 is also advanced with the first housing part 504. The second barrier 522 is advanced towards the closed end of the second housing part 506 and is brought into abutment with the closed end. In this arrangement, the barrier 520 substantially obstructs the open end 519 of the conduit 512 and the second barrier 522 substantially obstructs the air inlet 514.

The element 500 is shown in a disabling arrangement in FIG. 11. In the disabling arrangement, the disabling mechanism of the element 500 has been operated and the element has been rendered irreversibly inoperable.

In the disabling arrangement, the first barrier 512 substantially obstructs the open end 519 of the conduit 512 and the second barrier 522 substantially obstructs the air outlet 514. This substantially blocks the air passage through the element at two places. This renders the air passage and the element 500 irreversibly inoperable.

It will be appreciated that the elements described above may not be cartridges for aerosol-generating systems, but rather may be integral parts of aerosol-generating systems.

It will also be appreciated that features described for one embodiment may be provided in other example embodiments. In particular, it will be appreciated that elements, cartridges and aerosol-generating systems according to at least one example embodiment may comprise more than one type of disabling mechanism. In at least one example embodiment, the element may comprise means for rendering air passages of the element inoperable and means for rendering the aerosol generator irreversibly inoperable. In at least one example embodiment (not shown), the element comprises barriers for substantially obstructing air passages of the element on operation of the disabling mechanism, as shown in FIGS. 8, 9, 10 and 11 and an electrical circuit comprising frangible connections, as shown in FIGS. 6 and 7.

The exemplary embodiments described above illustrate but are not limiting. In view of the above discussed exemplary embodiments, other embodiments consistent with the above exemplary embodiments will now be apparent to one of ordinary skill in the art.

The invention claimed is:

1. A cartridge comprising:

a first housing having a manually deformable portion along a length thereof;

at least one piercing element on an inner surface of the first housing;

a first storage portion having an outer wall, the first storage portion configured to store an aerosol-forming substrate within the first housing;

a secondary storage portion adjacent the first storage portion, the secondary storage portion including an inner wall, the inner wall surrounding the outer wall of the first storage portion, the secondary storage portion containing a super absorbent polymer (SAP) material, wherein when an adult consumer squeezes the manually deformable portion, the at least one piercing element pierces the outer wall of the first storage portion and the inner wall of the secondary storage portion such that the SAP material is released into the first storage portion and the cartridge is disabled; and an aerosol generator in fluid communication with the first storage portion.

2. The cartridge of claim 1, wherein the at least one piercing element includes pairs of opposing arcuate cutting blades.

3. The cartridge of claim 1, wherein the aerosol generator comprises:

a heater; and a wick, the wick extending into the first storage portion.

4. The cartridge of claim 1, further comprising:

a conduit defining an air passage, the air passage extending through the first storage portion.

5. The cartridge of claim 1, wherein the aerosol-forming substrate is a liquid aerosol-forming substrate.

6. The cartridge of claim 1, wherein the manually deformable portion is a region of the first housing having a thickness that is less than a thickness of other regions of the first housing.

7. The cartridge of claim 1, wherein the at least one piercing element is spaced from the inner wall of the secondary storage portion.

8. The cartridge of claim 1, wherein the at least one piercing element is spaced from the outer wall of the first storage portion.

9. A cartridge comprising:

a first housing having a manually deformable portion along a length thereof;

at least one piercing element on an inner surface of the first housing;

a first storage portion having an outer wall, the first storage portion configured to store an aerosol-forming substrate within the first housing;

a secondary storage portion adjacent the first storage portion, the secondary storage portion including an inner wall, the inner wall surrounding the outer wall of the first storage portion, wherein when an adult consumer squeezes the manually deformable portion, the at least one piercing element pierces the outer wall of the first storage portion and the inner wall of the secondary storage portion such that the aerosol-forming substrate is released into the secondary storage portion and the cartridge is disabled; and an aerosol generator in fluid communication with the first storage portion.

10. An aerosol-generating device comprising:

a cartridge including, a first housing having a manually deformable portion along a length thereof, at least one piercing element on an inner surface of the first housing, a first storage portion having an outer wall, the first storage portion configured to store an aerosol-forming substrate within the first housing, a secondary storage portion adjacent the first storage portion, the secondary storage portion including an inner wall, the inner wall surrounding the outer wall of the first storage portion, wherein when an adult consumer squeezes the manually deformable portion, the at least one piercing element pierces the outer wall of the first storage portion and the inner wall of the secondary storage portion such that the aerosol-forming substrate is released into the secondary storage portion and the cartridge is disabled, and an aerosol generator in fluid communication with the first storage portion; and a power supply portion.

11. An aerosol-generating device comprising:

a cartridge including, a first housing having a manually deformable portion along a length thereof, at least one piercing element on an inner surface of the first housing, a first storage portion having an outer wall, the first storage portion configured to store an aerosol-forming substrate within the first housing, a secondary storage portion adjacent the first storage portion, the secondary storage portion including an inner wall, the inner wall surrounding the outer wall of the first storage portion, the secondary storage portion containing a super absorbent polymer (SAP) material, wherein when an adult consumer squeezes the manually deformable portion, the at least one piercing element pierces the outer wall of the first storage portion and the inner wall of the secondary storage portion such that the SAP material is released into the first storage portion and the cartridge is disabled, and an aerosol generator in fluid communication with the first storage portion; and a power supply portion.

12. The aerosol-generating device of claim 11, wherein the at least one piercing element includes pairs of opposing arcuate cutting blades.

13. The aerosol-generating device of claim 11, wherein the aerosol generator comprises:

a heater; and a wick, the wick extending into the first storage portion.

14. The aerosol-generating device of claim 11, further comprising:

a conduit defining an air passage, the air passage extending through the first storage portion.

15. The aerosol-generating device of claim 11, wherein the aerosol-forming substrate is a liquid aerosol-forming substrate.

16. The aerosol-generating device of claim 11, wherein the manually deformable portion is a region of the first housing having a thickness that is less than a thickness of other regions of the first housing.

* * * * *